May 3, 1966 G. PINAZZA 3,248,957
PERCUSSION APPARATUS, ACTUATED BY ECCENTRIC REVOLVING
MASSES, INCORPORATING AN ELECTRIC MOTOR
Filed Dec. 3, 1962 3 Sheets-Sheet 1

INVENTOR.
Giosue Pinazza
BY
Stevens, Davis, Miller & Mosher
ATTORNEYS

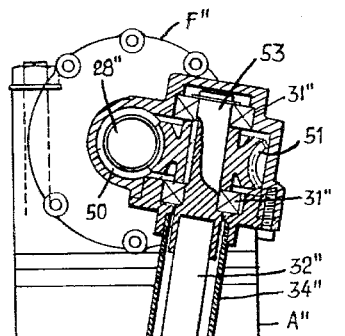
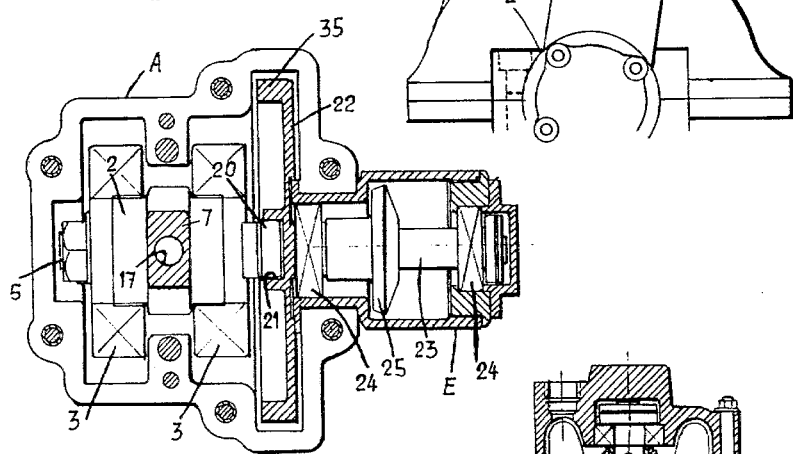
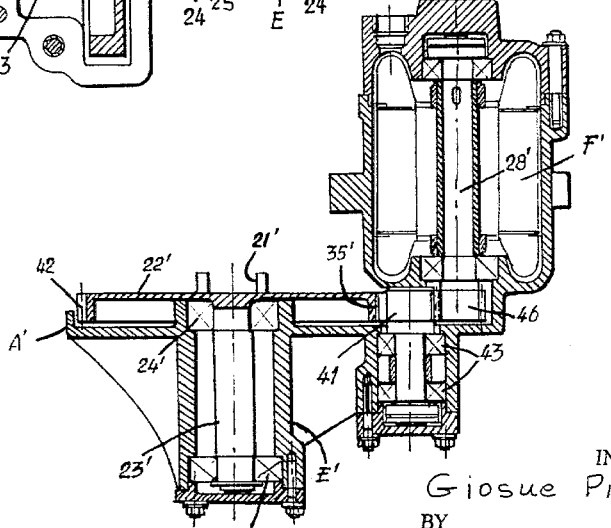

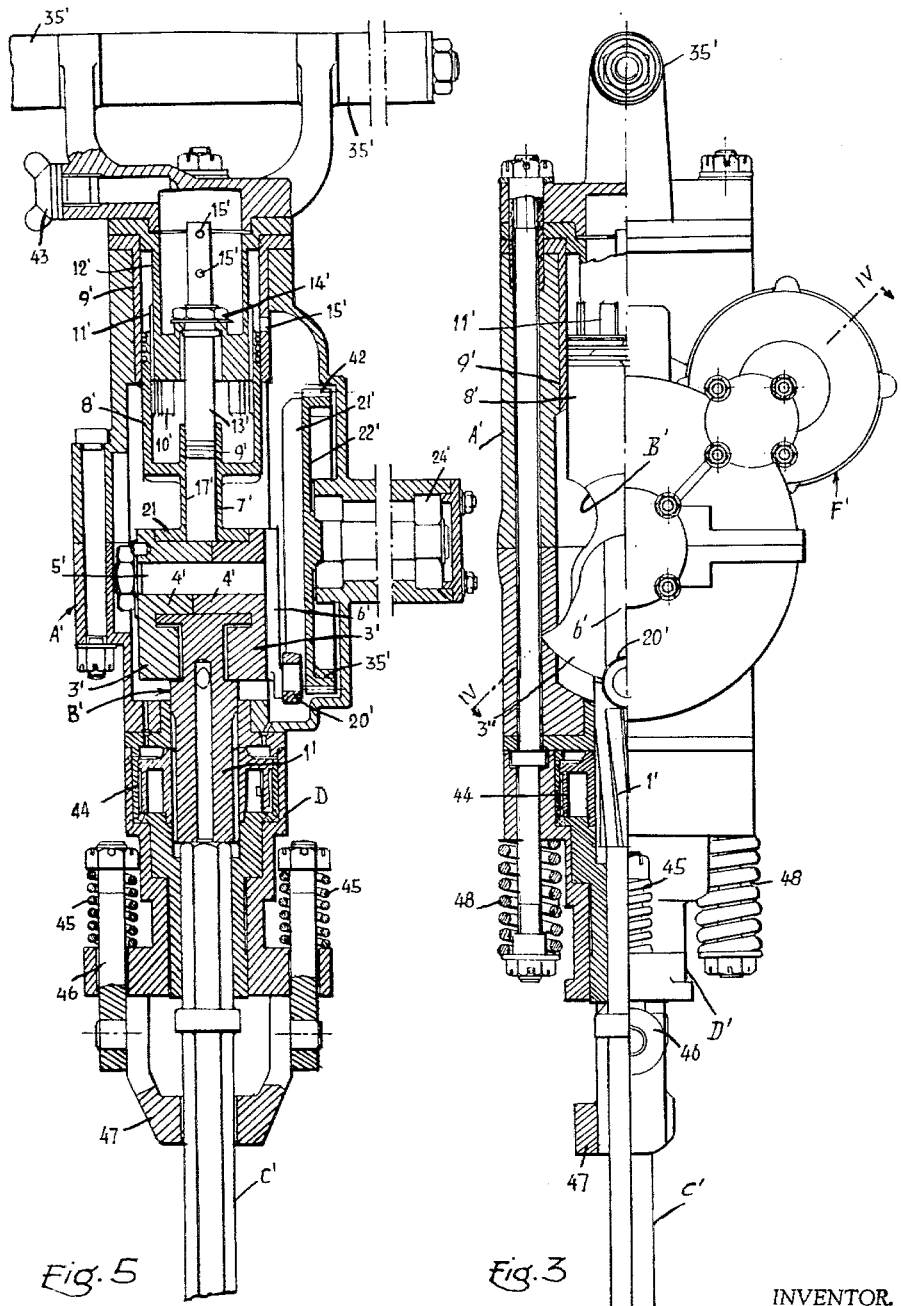

United States Patent Office 3,248,957
Patented May 3, 1966

3,248,957
PERCUSSION APPARATUS, ACTUATED BY ECCENTRIC REVOLVING MASSES, INCORPORATING AN ELECTRIC MOTOR
Giosuè Pinazza, Via Baretti 3, Milan, Italy
Filed Dec. 3, 1962, Ser. No. 241,914
Claims priority, application Italy, Dec. 13, 1961,
22,346/61
2 Claims. (Cl. 74—61)

The present invention relates to a percussion apparatus such as a power hammer actuated by revolving eccentric masses, incorporating an electric motor.

Percussion apparatuses are known, operated by means of eccentric rotating masses, wherein the rotation of the masses is periodically accelerated and retarded during each revolution, so that the resultant of the centrifugal force is greatest in the direction of the desired percussive force. This result is obtained by means of two crank arms cooperating with each other; the one solid with the motor shaft, supported by the eccentric mass, the other solid with the motor shaft, supported by the frame of the apparatus. The latter crank arm rotates at a substantially uniform speed, having a periodically variable length during its rotation which is a function of the relative position of the axis of the eccentric masses which are supported by the striking mass in respect to the crank arm connected to the motor.

Such apparatuses are usually mechanically driven by a motor means external to the apparatus. With a view to rendering the mechanism independent and easier to handle, it has been deemed convenient to incorporate the driving electric motor of the high frequency type into the basic body of the percussion apparatus.

Such a new arrangement involves the solution of the problem of aligning the motor transmission means taking into account the shocks absorbed by said transmission during the rotation of the eccentric rotating masses and the consequent amplification generated in the mechanical transmission between motor crank and electric motor. The necessity also exists of avoiding variations in the speed of the electric motor shaft and providing for the relative lack of compensations in the dynamic cycle which results in dangerous phase displacements in the transmission means with a consequent reduction of the percussive effect. Substantially, it is necessary for the motor crank shaft to have a substantially uniform rotary movement and it is to be avoided that the eccentric masses revolving in their path pass from the condition of "masses" in general to the condition of "motive" masses which impose upon the electric motor shaft a couple tending to accelerate the motor rotor.

These objects are attained by the device according to the present invention, which is substantially characterized by the fact that in the transmission between the eccentric revolving masses and the electric motor an operating member is inserted to prevent the eccentric masses, in the phase wherein they assume the function of "motive" masses from transmitting a driving couple to the electric motor shaft.

According to a practical embodiment of the apparatus such a member is constituted by a fly crown solid with the motor crank, which crown is intended to render substantially uniform the velocity of said crank and to absorb the energy of said eccentric masses so as to prevent them from transmitting sudden driving forces to the electric motor. The invention will now be described with reference to the appended drawings given as an indicative example.

FIG. 2 is a cross-section thereof according to the line II—II of FIG. 1.

FIG. 3 shows partly in view and partly in section a second form of embodiment of the invention.

FIG. 4 is a cross-section according to the lines IV—IV of FIG. 3.

FIG. 5 is an axial section at 90° to the section of FIG. 3.

FIG. 6 is a section of a variant to the device illustrated in FIG. 1 at 90° with respect to FIG. 1.

Figure 1:
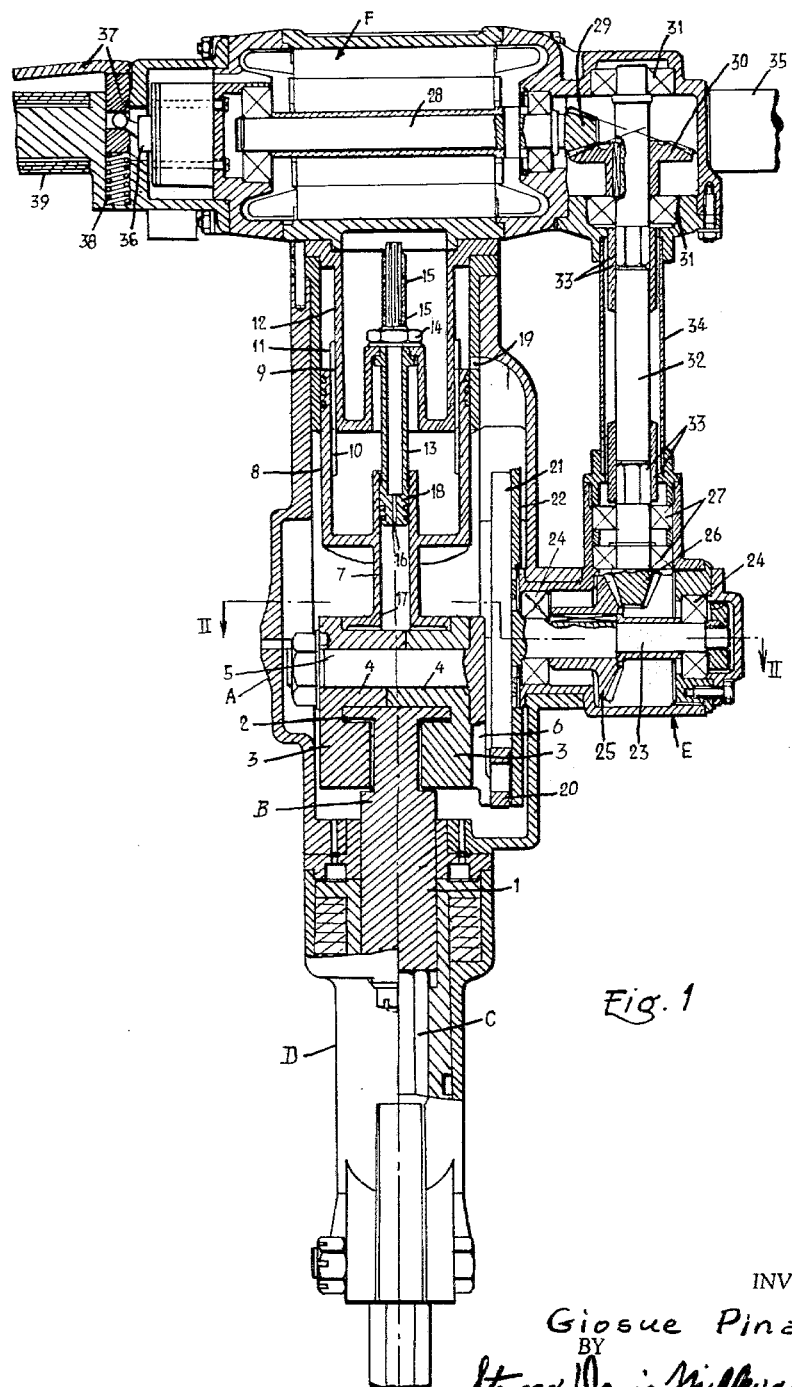
FIG. 1 shows an axial section of a first form of embodiment of the apparatus.

With reference to the drawings, in FIGS. 1 and 2 A indicates the lower body of the apparatus, whilst B represents the reciprocating percussive striking device. The latter comprises an end portion 1 intended to act directly upon the drilling tool C and a central sleeve portion constituting the support for the two eccentric masses 3 which are torsionally interconnected by teeth on elements 4 and axially interconnected by means of tie rod 5 which is integrally solid with crank 6.

The upper part of the oscillating device presents a standard axial element 7 and a piston 8 which slides sealingly in the cylinder 9 which in turn is solid with the base body A. The piston 8 is cylindrical and presents interiorly axial grooves 10 associated with complementary grooves 11 of an internal cylindrical element 12 also solid with the base body A, in such a manner as to prevent relative rotation between the two parts A and B.

The element 12 is hollow and serves as a reservoir for the lubricating oil of the support 2 for the eccentric masses. An axial conduit 13, connected to the element 12 through the nut 14, draws off the oil through the radial holes 15 and conveys it through the bottom hole 16 into the hole 17 of the upright 7 as well as to the sliding surface of the pins 4 of the eccentric masses.

The lower end 18 (piston) of the conduit 13 slides sealingly in the hole (cylinder) 17 in such a manner as to produce, during the reciprocating axial movement of the percussion masses B, an alternating compression and aspiration which facilitate the inflow of the lubricant to the support 2. The piston 8 in cooperation with the cylinder 9 has the task of providing a pneumatic cushion for absorbing the flow of oil on the return of the percussion masses B and a storing of energy to be used during the return active stroke of the masses themselves. The hole 19 connects the atmosphere and the cylinder 9 at the termination of the active stroke of the masses B. The body A is sealed in its lower part by the sleeve D which guides the drilling tool C.

The end of the crank 6 comprises a small roller 20 which can run in a diametrial groove 21 of the discoidal element 22 so as to provide a variable throw motor crank.

The discoidal element 22, is in fact, solid with the shaft 23 supported, through the bearings 24, by the box E provided in the base body A.

On the shaft 23 is keyed a bevel gear 25 which cooperates with the bevel pinion 26 carried by the bearing 27. The driving electric motor F (of the high frequency type) is rigidly fixed to the body A in the upper part of the same and has its rotational axis perpendicular to the percussion axis. The shaft 28 of the motor F carries a pinion 29 cooperating with the bevel gear 30, supported by the body of the motor F through the bearings 31.

The axes of the gears 30 and 26 are aligned and the gears are interconnected by a partially flexible torsion shaft 32 through the end couplings 33 of the axially slidable type (hexagonal, square splined or otherwise). This solution permits the realization of a correct mounting of the members without requiring a high working accuracy of the motor in respect to the shaft of the pinion 26. The cases supporting the shafts of the bevel pinions 26 and 30 are connected by the rigid tubular sheath 34.

The electric motor drives, therefore, the discoidal element 22 through a double reducing gearset with orthogonal axes 29/30 and respectively 25, 26.

In order to protect this transmission chain itself and the motor from the effects of the periodic variation in the revolution of the couple and speed, the discoidal element 22 is provided with a wheel rim 35 (FIG. 2) intended to store up and then give up in each revolution the difference between the energy absorbed by the revolving masses 3 and the average energy transmitted by the motor F. As is shown in FIGURE 2, the rim 35 constitutes a balanced mass relative to the rotative axis of discoidal element 22. The flexible shaft 32, through a limited torsional elasticity assists in dampening of the blows which would, otherwise be transmitted to the electric motor F.

The starting and stopping of the motor F is obtained by means of an electric switch 36 operated by means of the leverages 37 against a spring 38. Coaxial with the motor shaft are provided the two grasp handles 39 of the apparatus. In the embodiment according to FIGS. 3 and 4 in which the parts corresponding to those described are contra-distinguished by the same reference signs provided with a prime, the electric motor F' instead of being arranged at the upper end of the apparatus is mounted at one side and the transmission of the movement to the motor crank is obtained by means of three cylindrical gears 40, 41, and 42, the first one solid with the shaft F' of the motor, the second an idle gear (carried by the bearings 43) and the third solid with the discoidal element 22' constituting the driving crank.

The toothed crown 42 constitutes at the same time the wheel rim 35' regulating the speed of the driving crank.

In FIGS. 3 and 5, 43 indicates the lubricating oil filling plug, with 44, the known unidirectional rotation device for obtaining the intermittent motion of the drilling tool C' at each blow and with 45, the helicoidal springs which, through the links 45 take care of the retention of the bracket 47 so as to absorb the active stroke end blow of the drilling tool C.

The helicoidal springs 48 elastically retain to the body A' the sleeve D' so that the latter provides the absorption of the active stroke end blow of the percussion mass B'.

In the example according to FIG. 6 (in which the equivalent parts to those of FIG. 1 are contra-distinguished by the same reference signs provided with a double prime) on the shaft 28" of the motor F" is keyed an endless screw 50 which cooperates with the helicoidal gear 51 supported by the shaft 53 by means of the ball bearings 31". The shaft 53 transmits, in turn, the movement to the driving crank through the flexible torsion shaft 32" and linkages corresponding to those illustrated in FIG. 1.

The coupling between the screw 50 and the helicoidal wheel 51 is of the irreversible type and therefore no couple can be transmitted by the eccentric rotating masses (during their "motive" phase) to the electric motor shaft even in the case when as provided in the last instance, no fly mass is connected to the motive crank, and therefore, the electric motor shaft is substantially free from the magnetic couple effects developing during the cycle on account of the dynamic characteristics of the device.

In practice the particulars of the embodiment of the apparatus may also vary without leaving the ambit of the invention and therefore, the domain of the Letters Patent.

I claim:

1. A percussion apparatus, such as a power hammer, comprising a supporting body, a percussive tool member mounted for reciprocal linear movement within said body, a mass member bearing upon one end of said tool member, a crank eccentrically connected to said mass member, a discoidal member rotatably mounted in said body and having a diametrial groove in a face thereof which faces said crank, a roller connected to said crank and rollably engaged in said groove, a power driving means comprising an electric motor mounted on said body and a transmission means adapted to transmit power between said motor and said discoidal member, said discoidal member comprising a flywheel means consisting of a rim whose mass is distributed on the periphery of said discoidal member, said mass being balanced relative to the rotative axis of said discoidal member.

2. The apparatus of claim 1, wherein said transmission means comprises a flexible torsion shaft mounted in said body and arranged so as to transmit rotary motion from said motor to said discoidal member, said shaft being drivingly connected to said motor by means of an irreversible gearing arrangement which provides for unidirectional transmission of rotary motion from said motor to said shaft.

References Cited by the Examiner

UNITED STATES PATENTS

| | | | |
|---|---|---|---|
| 1,667,546 | 4/1928 | Goldschmidt | 74—61 |
| 1,672,885 | 6/1928 | Goldschmidt | 74—61 |
| 2,054,253 | 9/1936 | Horsch | 74—61 |
| 2,293,962 | 8/1942 | Baily | 74—61 X |
| 2,350,921 | 6/1944 | Pinazza | 173—49 X |
| 2,632,331 | 3/1953 | Pinazza | 74—61 |

FOREIGN PATENTS 750,897   1/1945   Germany.

BROUGHTON G. DURHAM, *Primary Examiner.*

MILTON KAUFMAN, *Examiner.*

F. E. BAKER, *Assistant Examiner.*